No. 659,378. Patented Oct. 9, 1900.
L. B. REED.
SEALING CLAMP.
(Application filed Feb. 12, 1900.)

(No Model.)

Witnesses:
Chas. D. Swift
E. C. Keister

Inventor:
Laura B. Reed
Per
Thomas P. Simpson Atty

United States Patent Office.

LAURA B. REED, OF MONTICELLO, INDIANA.

SEALING-CLAMP.

SPECIFICATION forming part of Letters Patent No. 659,378, dated October 9, 1900.

Application filed February 12, 1900. Serial No. 4,950. (No model.)

*To all whom it may concern:*

Be it known that I, LAURA B. REED, a citizen of the United States, residing at Monticello, in the county of White and State of Indiana, have invented certain new and useful Improvements in Sealing-Clamps; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to sealing vessels hermetically with a rubber ring between cover and body, so that there shall be no access of air to the interior, also for securing lids, corks, &c. As this method of securing vessels has not heretofore been thoroughly effective, I clamp the rubber in such a manner that it cannot possibly "suck up or twist."

Figure 1:
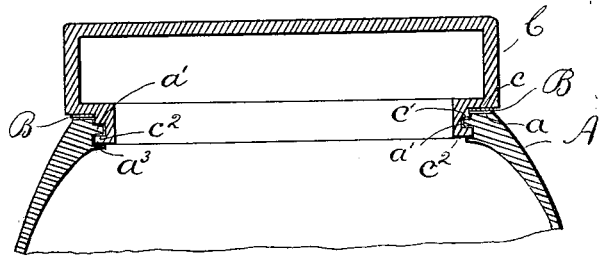
Figure 2:
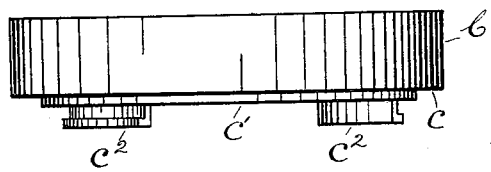
Figure 3:
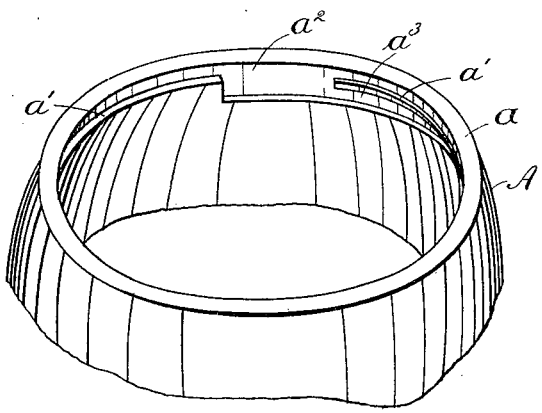

Figure 1 of the drawings is a cross-section of the upper portion of the vessel and of the cover; Fig. 2, a side elevation of the cover, showing the collar with its lugs; and Fig. 3, a perspective view of the upper portion of vessel, showing the recess in which the collar of cover fits and the shoulder upon which it rests.

In the drawings, A represents the upper portion of the body of vessel with the flat surface $a$, on which the flat rubber annulus B is supported, while C is the cover, with a corresponding rim-surface $c$, which bears upon the rubber B. The cover C has a subjacent collar $c'$, which fits within the vessel-rim and rests on the shoulder $a'$ of vessel, while the collar itself is provided with one or more L-shaped lugs $c^2$, which pass down through opening $a^2$. To one side of said opening extends the wedge-groove $a^3$, in which is jammed one of the lugs $c^2$ by simply turning the cover. This brings the rubber B into such a state of compression that all air is excluded from the interior of the vessel. The L shape of the lug $c^2$ prevents any rising or play in the groove $a^2$. Hence the contents of the vessel when opened will be exactly the same as when put in.

Each lug $c^2$, opening $a^2$, and wedge-groove $a^3$ form a part of my immovable clamp, which I preferably use in pairs, although I do not confine myself to any particular number, as these may vary with the vessel to be hermetically sealed.

My clamps may be used in bottle-necks and straight or telescoping vessels, the same being of metal, wood, or earthenware and of any suitable shape. I use no springs or soldering or extra pieces on the exterior of vessel. I prefer telescoping vessels, as they can be more quickly filled or cleaned and take up less space in shipping.

What I claim as new, and desire to protect by Letters Patent, is—

In self-sealing vessels, the body A having the rim $a$ flat on top and supporting a flat rubber ring B, the shoulders $a'$, openings $a^2$ and grooves $a^3$, the said grooves being horizontal at bottom and downwardly inclined at top, in combination with the cover C resting with a flat face on said rubber, having the collar $c'$ fitting within rim $a$ on the shoulders $a'$, and provided with L-shaped lugs $c^2$ that form, with the collar, a groove as shown and described, for the purpose set forth.

In testimony whereof I affix my signature in presence of two witnesses.

LAURA B. REED.

Witnesses:
 MARIETTA HARSELL,
 Mrs. R. J. HALL.